Aug. 7, 1962     H. C. ROBBINS     3,047,993
HERMETICALLY SEALED CARTRIDGE WITH LEAK
DETECTION MEANS
Filed Feb. 3, 1960
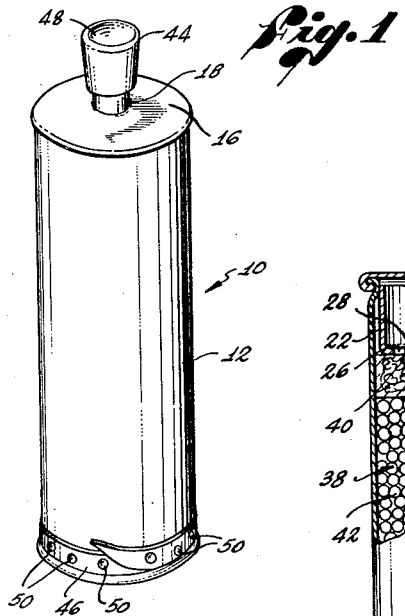
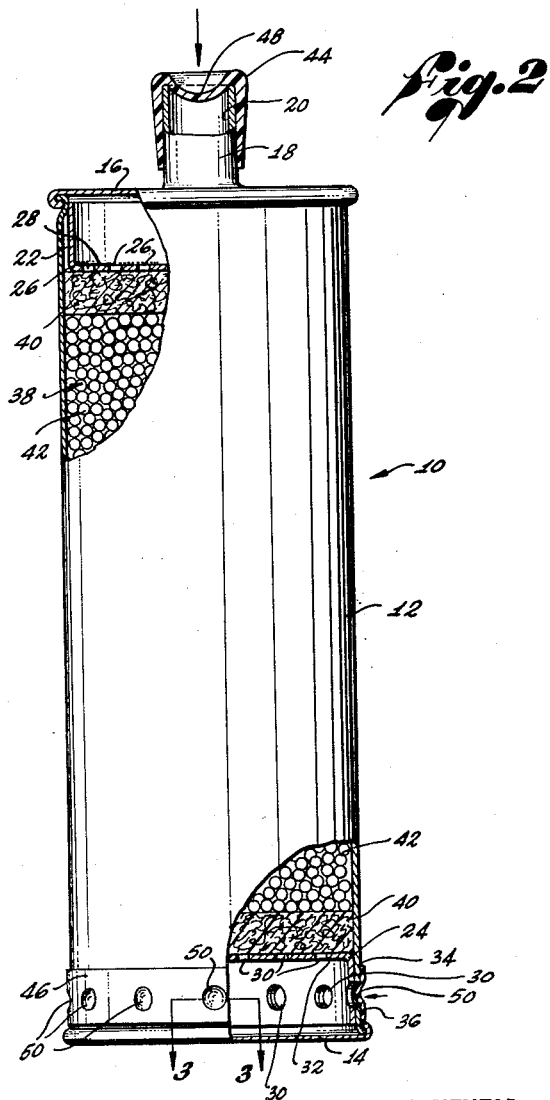
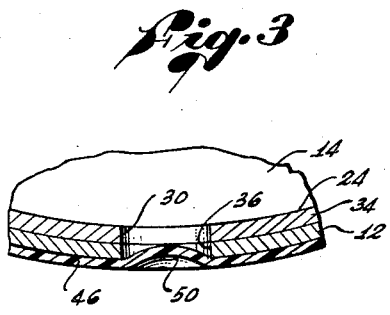
INVENTOR.
HUGH C. ROBBINS
BY Lilly & Nyhagen
Attorneys

United States Patent Office 3,047,993
Patented Aug. 7, 1962

3,047,993
HERMETICALLY SEALED CARTRIDGE WITH LEAK DETECTION MEANS
Hugh C. Robbins, Inglewood, Calif., assignor to Robbins Aviation, Inc., Vernon, Calif., a corporation of California
Filed Feb. 3, 1960, Ser. No. 6,414
1 Claim. (Cl. 55—274)

This invention relates generally to replaceable cartridge-type fluid purifying and desiccating systems and particularly to an improved replacement cartridge for such purifying systems.

Recent technological advances in precision items have created an increasing demand for highly purified air and other fluids. For example, many precision items, such as air bearings for high-speed instruments, require air which is free of solid matter, liquid vapor, and other contaminants to a fractional part per million by volume.

In order to achieve this high order of desiccation and purification, it is essential that the replacement cartridges be hermetically sealed against leakage of moisture and other contaminants into the cartridges until the latter are placed in the purifying system. Even a minute leak in a cartridge may allow sufficient moisture or other contaminants to enter the filler material of the cartridge to render the latter completely unsuitable for use in the highly efficient systems under discussion. For example, a moisture content of one percent by weight of the cartridge filler material will prevent a desiccant cartridge from removing water vapor to the low concentration mentioned. Accordingly, consistent performance of a highly efficient replaceable cartridge-type desiccating and purifying system can be assured only if each replacement cartridge is checked for leaks immediately before it is installed in the system.

Heretofore, it has been impossible to easily check the hermetically sealed replacement cartridges for leaks. As a result, the high degree of purification mentioned earlier could not be achieved on a consistent basis with replaceable cartridge-type purifying systems using the existing hermetically sealed replacement cartridges.

A general object of this invention is to provide a hermetically sealed replacement cartridge for replaceable cartridge-type desiccating and purifying systems of the character described, which cartridge can be readily checked for leaks to permit the operating condition of the cartridge to be ascertained at the time of its installation in a system.

Other objects of the invention are concerned with providing a replacement cartridge of the character described which is simple, inexpensive, reliable, and otherwise ideally suited to its intended purposes.

The invention will be best understood from the following detailed description thereof taken in connection with the attached drawing, wherein:

FIG. 1 is a view in perspective of a replacement desiccant cartridge embodying the leak detection means of the invention;

FIG. 2 is an enlarged elevation, partly in section, of the replacement cartridge in FIG. 1; and FIG. 3 is an enlarged section taken along line 3—3 of FIG. 2.

The desiccant cartridge 10 illustrated in this drawing comprises an outer metal canister 12 having end walls 14 and 16. Extending axially from the end wall 16 is an inlet tube or nipple 18. The passage 20 in this tube opens to the interior of the canister 12.

Fixed within opposite ends of the canister are perforate, cup-shaped spacers 22 and 24. Spacer 22 has a multiplicity of openings 26 in its circular end wall 28. Spacer 24 has a multiplicity of openings 30 in its end wall 32 and its cylindrical side wall 34. The canister 12 has openings 36 registering with the openings in the cylindrical wall of spacer 24.

The filler material 38 of the cartridge consists of two circular glass fiber pads 40 adjacent the spacers 22 and 24, respectively, and a desiccant 42, such as silica gel beads, between the pads.

The cartridge is installed in a desiccating and purifying system in such a way that the gas to be purified enters the cartridge through the inlet tube 18 and leaves the cartridge through the circular row of canister openings 36.

The cartridge is hermetically sealed by means of an inlet sealing cap 44 which is fitted over the end of the inlet tube 18 and an outlet sealing strip 46 which is applied over the canister openings 36. Both the cap and strip comprise polyethylene plastic or other suitable material. The cap is proportioned so that it is stretched slightly to fit over the inlet tube and is thus frictionally held on the tube. The sealing strip comprises an adhesive tape which adheres to the outer surface of the canister.

The desiccant 42 is injected into the cartridge at a temperature of approximately 300° F. Cooling of the desiccant creates a partial vacuum within the cartridge which draws in or dimples the end wall of the sealing cap 44, as indicated at 48, and also the portions of the sealing strip 46 overlying the canister openings 36, as indicated at 50. These dimples will exist, of course, only so long as the interior of the cartridge remains at a reduced pressure. Should the cartridge develop a leak, the interior pressure of the cartridge will rise to atmospheric and the dimples 48 and 50 will disappear.

These dimples, therefore, provide a means to enable both the manufacturer and user of the cartridge to readily ascertain whether or not the cartridge has developed a leak. The operating condition of the cartridge may thus be quickly determined before installation of the cartridge in a desiccating and purifying system. Consistent, highly efficient performance of the system can thus be achieved.

While the invention has been described in connection with a desiccant canister, it is obvious that it may, as well, be utilized on other types of similarly configurated replacement cartridges for fluid purifying systems which are hermetically sealed under a partial vacuum.

What is claimed is:

A replacement cartridge for a replaceable cartridge-type fluid purifying system, comprising: a cylindrical canister including opposite end walls and a nipple extending from one end wall having a central passage communicating to the interior of the canister, a cap fitted on said nipple to hermetically seal said passage, the cylindrical wall of said canister having a circumferential row of holes adjacent the other end wall, a strip of adhesive tape applied over said row of holes to hermetically seal the latter, a desiccant within the canister between said ends thereof for removing entrained liquid from fluid passing through the cartridge, and the interior of the canister being under a partial vacuum whereby the portions of said tape overlying said holes are depressed into the holes by atmospheric pressure to provide an exteriorly visible indication of the existence of the partial vacuum in the canister.

References Cited in the file of this patent
UNITED STATES PATENTS

| | | |
|---|---|---|
| 25,894 | Fridley et al. | Oct. 25, 1859 |
| 225,752 | Griswold et al. | Mar. 23, 1880 |
| 2,040,798 | Schoonmaker | May 12, 1936 |
| 2,845,138 | Gageby | July 29, 1958 |